3,827,991
COMPOSITION CONTAINING CRYSTALLINE 1,2-POLYBUTADIENE
Noriaki Ando, Yasuyuki Yaeda, and Isao Furuta, Yokkaichi, and Ryuichi Sakata, Kobe, Japan, assignors to Japan Synthetic Rubber Co., Ltd., Tokyo, Japan
No Drawing. Filed Mar. 12, 1973, Ser. No. 340,128
Claims priority, application Japan, Sept. 11, 1972, 47/90,468
Int. Cl. C08c 9/04; C08f 29/14
U.S. Cl. 260—5
11 Claims

ABSTRACT OF THE DISCLOSURE

A rubber composition consisting essentially of 3 to 50% by weight of a 1,2-polybutadiene having a 1,2-addition units content of 70% or higher and crystallinity of 5% or higher, and 97 to 50% by weight of at least one conjugated diene-based rubbery polymer selected from the group consisting of styrene-butadiene copolymer rubber, polyisoprene rubber, natural rubber, acrylonitrile-butadiene rubber and polychloroprene rubber. Said rubber composition has an improved green strength, and excellent extrudability, and moldability and vulcanizates obtained therefrom have hardness and high resistance to ozone and weathering.

---

This invention relates to a rubber composition having improved properties. More particularly, this invention relates to a rubber composition comprising 1,2-polybutadiene and a conjugated diene-based rubbery polymer and possessing an extremely high green strength, excellent extrudability and moldability and a tendency to yield a vulcanizate of high hardness and of high resistance to ozone and weathering.

Rubbers for general uses which have hitherto been commercially available, particularly conjugated diene-based rubbers, have excellent rubbery properties such as low heat build-up, reduced permanent set, and yet high impact resilience, but, on the other hand, have such defects as low green strength, inferior extrudability and moldability, and inferior resistance of the vulcanizate to ozone and weathering.

In order to improve the green strength, there have hitherto been proposed processes whereby a resinous polymer such as polyethylene is blended or chemicals such as nitroso compounds and phthalic anhydride are incorporated. However, problems still remain in physical properties of the vulcanizate in the former process and in economical aspect in the latter process.

1,2-Polybutadiene shows greatly different physical properties, depending upon its crystallinity. It is possible, therefore, to vary the physical properties of 1,2-polybutadienes from rubbery to resinous by properly controlling the crystallinity. The method of controlling the crystallinity has already been established in U.S. Pat. 3,498,963 and 3,522,332. The thus obtained 1,2-polybutadiene having a 1,2-addition units content of 70% or higher and crystallinity of 5% or higher has properties intermediate between rubber and resin.

As a result of an extensive study, the present inventors have found that by incorporating the above-mentioned 1,2-polybutadiene into a conjugated diene-based rubbery polymer there can be obtained a rubber composition which is greatly high in green strength, is excellent in extrudability, moldability and surface appearance after treatment, and tends to yield a vulcanizate possessing high hardness and high resistance to ozone, without imparing the characteristics of the conjugated diene-based rubbery polymer, such as low heat build-up, low permanent set, high impact resilience.

This invention provides a rubber composition consisting essentially of 3 to 50% by weight of 1,2-polybutadiene having a 1,2-addition units content of 70% or higher and crystallinity of 5% or higher, and 97 to 50% by weight of at least one conjugated diene-based rubbery polymer selected from the group consisting of styrene-butadiene copolymer rubber, polyisoprene rubber, natural rubber, acrylonitrile-butadiene copolymer rubber and polychloroprene rubber.

The 1,2-polybutadiene to be used in this invention is that having a 1,2-addition units content of 70% or higher, preferably 85% or higher, and crystallinity of 5% or higher, preferably 5 to 50%, especially preferably 5 to 30% in view of the ease of incorporation. Its molecular weight can be selected from a wide range, so both liquid and solid polymers may be used though it is preferable to use a polymer having an intrinsic viscosity $[\eta]$ of 0.7 dl./g. or higher (determined in toluene at 30° C.). When the 1,2-addition units content is below 70%, the tensile strength and tear strength will be markedly low. When the crystallinity is below 5%, it is impossible to obtain the result expected in this invention.

In this invention, the conjugated diene-based rubbery polymers may be used alone or in combination of two or more.

In this invention, the method of blending the aforesaid 1,2-polybutadiene with a conjugated diene-based rubbery polymer has no particular restriction. Both solutions of the respective components can be mixed with each other followed by removing the solvents, or alternatively, both components in the form of solids can be blended with each other by a conventional method, for example, by means of roll, Banbury's mixer or kneader to obtain a similar result.

The amount of 1,2-polybutadiene to be blended is 3 to 50%, preferably 5 to 50% by weight. If the amount exceeds 50% by weight, the heat build-up permanent set or impact resilience will be adversely affected, while if it is less than 3% by weight, no substantial merit of this invention will be obtained.

It is, of course, possible to further incorporate into the rubber composition of this invention at least one conventional compounding ingredient, such as reinforcing agents, fillers, extender oils, pigments, vulcanizing agents, vulcanizing accelerators, vulcanizing activators, antioxidants, ultraviolet absorbers, blowing agents, odorants, softening agents, etc.

The rubber composition obtained according to this invention possesses a high green strength, excellent extrudability, and excellent moldability and in addition, a vulcanizate therefrom has a high hardness and excellent resistance to ozone and weathering.

The invention is further explained below in more detail with reference to examples which are not by way of limitation but by way of illustration.

The characteristic properties of 1,2-polybutadienes used in the examples are as follows:

|   | 1,2-addition units content (percent) | Crystallinity (percent) | Intrinsic viscosity ($[\eta]$,30° C. in toluene) |
|---|---|---|---|
| A | 89.8 | 18 | 1.70 |
| B | 92.3 | 23 | 2.27 |
| C | 93.6 | 47 | 1.12 |
| D | 81.7 | 0 | 2.05 |
| E | 92.0 | 25 | 1.31 |

The micro-structure of the above-noted polybutadienes was measured by the infrared absorption spectrum method of D. Morero et al. [Chimie et Ind., 41, 758 (1959)]. The crystallinity was determined by the density measurement method in which the following equation was used:

$$\frac{1}{d} = \frac{X}{d_{cr}} + \frac{1-X}{d_{am}}$$

where $d$: density of the specimen measured at 20° C.,
$d_{cr}$: density of the crystalline region,
$d_{am}$: density of the amorphous region, and
$X$: crystallinity in percent.

The value of $d_{cr}$ used was that of the crystalline 1,2-polybutadiene calculated by Natta from X-ray experiments to be 0.963 [L. G. Natta, J. Polymer Sci., 20, 251 (1956)]. The value of $d_{am}$ used was 0.892, or the density of the 1,2-polybutadiene obtained by the synthesizing process proposed in U.S. Pat. 3,498,963.

TABLE 1

| Compounding ingredients (parts by wt.) | Sample number |||||||
|---|---|---|---|---|---|---|---|
| | 1[1] | 2 | 3 | 4 | 5 | 6[1] | 7[1] |
| | | A | | B | | D | |
| 1,2-polybutadiene | 0 | 10 | 30 | 10 | 30 | 10 | 30 |
| Styrene-butadiene rubber (JSR 1500*) | 100 | 90 | 70 | 90 | 70 | 90 | 70 |
| Carbon black (HAF) | | | | 50 | | | |
| Process oil (high aromatic type) | | | | 10 | | | |
| Zinc oxide | | | | 3 | | | |
| Stearic acid | | | | 2 | | | |
| Antioxidant (N-isopropyl-N'-phenyl-p-phenylenediamine) | | | | 1 | | | |
| Accelerator CZ (N-cyclohexyl-2-benzothiazyl sulfenamide) | | | | 0.8 | | | |
| Sulfur | | | | 1.75 | | | |

[1] Comparative example.
*Manufactured by Japan Synthetic Rubber Co., Ltd.

Measurements were made on the resulting compositions for green strength and extrudability, and on the vulcanizates of the compositions for physical properties and ozone resistance. The results obtained were as shown in Table 2.

TABLE 2

| Item of test | Sample number |||||||
|---|---|---|---|---|---|---|---|
| | 1[a] | 2 | 3 | 4 | 5 | 6[a] | 7[a] |
| Green strength:[1] | | | | | | | |
| At room temperature: | | | | | | | |
| Tensile strength, kg./cm.[2] | 4.8 | 7.3 | 26.0 | 8.0 | 35.0 | 4.9 | 4.7 |
| Elongation, percent | 670 | 530 | 480 | 500 | 310 | 660 | 650 |
| At 40° C.: | | | | | | | |
| Tensile strength, kg./cm.[2] | 3.5 | 5.2 | 9.5 | 5.8 | 19.1 | 3.4 | 3.6 |
| Elongation, percent | 370 | 320 | 290 | 300 | 250 | 350 | 340 |
| At 80° C.: | | | | | | | |
| Tensile strength, kg./cm.[2] | 1.3 | 1.7 | 2.8 | 1.9 | 3.3 | 1.1 | 1.2 |
| Elongation, percent | 370 | 300 | 250 | 260 | 220 | 360 | 300 |
| Extrudability[2] | | | | | | | |
| Rate of extrusion, cc./min | 188.3 | | | 195.0 | 210.3 | | |
| Die shrinkage, percent | 44.2 | | | 43.8 | 46.0 | | |
| Die swelling, percent | 79.2 | | | 77.2 | 85.2 | | |
| Physical properties of vulcanizate:[3] | | | | | | | |
| 300% modulus, kg./cm.[2] | 70 | 80 | 106 | 82 | 115 | 73 | 91 |
| Tensile strength, kg./cm.[2] | 232 | 221 | 208 | 225 | 215 | 210 | 202 |
| Elongation, percent | 740 | 720 | 670 | 700 | 640 | 570 | 520 |
| Hardness, JIS Hs | 63 | 66 | 74 | 68 | 77 | 63 | 64 |
| Ozone resistance:[4] | | | | | | | |
| After— | | | | | | | |
| 1 hour | C-2 | B-2 | A-1 | B-2 | A-1 | B-2 | A-1 |
| 3 hours | C-2 | B-2 | A-2 | B-2 | A-2 | B-2 | A-2 |
| 10 hours | C-3 | B-3 | A-3 | B-3 | A-3 | B-3 | A-3 |
| 24 hours | C-4 | B-4 | A-4 | B-3 | A-4 | B-4 | A-4 |
| 48 hours | C-4 | B-4 | A-4 | B-4 | A-4 | B-4 | A-5 |
| 96 hours | C-5 | B-5 | A-5 | B-5 | A-5 | B-5 | A-5 |

[1] JIS K-6301 (JIS is an abbreviation of Japanese Industrial Standards.)
[2] ASTM D 2230-68. Conditions of extrusion: Barrel temperature, 70° C. die temperature, 110° C. Number of revolutions of the screw: 21 r.p.m.
[3] Measured on the vulcanizate obtained by vulcanizing at 145° C. for 30 minutes (JIS K-6301).
[4] ASTM D 1149-64 (JIS K-6301). Conditions of measurement: 40° C, ozone concentration, 50 p.p.h.m.; stretch ratio, 20%. Method of evaluation: Number of cracks—A, a small number B, many; C, innumerable. Size and depth of cracks: 1, invisible to the naked eye, but recognizable with a magnifying lens (10X); 2, recognizable with the naked eye; 3, deep and relatively large cracks (less than 1 mm.); 4, deep and large cracks (from 1 mm. to 3 mm.); 5, more than 3 mm. cracks or cracks almost leading to cutting.
[a] Comparative example.

EXAMPLE 1

Mixtures in accordance with the compounding recipes (parts by weight) shown in Table 1 were blended by Banbury's mixer to obtain rubber compositions.

EXAMPLE 2

Mixtures prepared in accordance with the compounding recipes (parts by weight) shown in Table 3 were blended by Banubury's mixer to obtain rubber compositions.

TABLE 3

| Compounding ingredient (parts by wt.) | Sample number ||||||||
|---|---|---|---|---|---|---|---|---|
| | 8[1] | 9 | 10 | 11 | 12[1] | 13 | 14 | 15 | 16 |
| 1,2-polybutadiene, B | 0 | 5 | 15 | 30 | 0 | 5 | 15 | 30 | |
| 1,2-polybutadiene, C | | | | | | | | | 15 |
| Styrene-butadiene rubber (JSR 1500) | 100 | 95 | 85 | 70 | | | | | 85 |
| cis-Polyisoprene rubber (Natsyn 2200*) | | | | | 100 | 95 | 85 | 70 | |
| Carbon black (HAF) | | | 50 | | | | 50 | | 50 |
| Process oil (high aromatic type) | | | 10 | | | | 5 | | 10 |
| Zinc oxide | | | 3 | | | | 3 | | 3 |
| Stearic acid | | | 2 | | | | 2.5 | | 2 |
| Antioxidant (N-isopropyl-N-phenyl-p-phenylenediamine) | | | 1 | | | | 1 | | 1 |
| Accelerator CZ (N-cyclohexyl-2-benzothiazyl sulfenamide) | | | 0.8 | | | | 0.8 | | 0.8 |
| Sulfur | | | 1.75 | | | | 2.0 | | 1.75 |

[1] Comparative example.
* Manufactured by Goodyear Tire & Rubber Co., Ltd.

Measurements were made on the resulting compositions for green strength and extrudability, and on the vulcanizates of the compositions for physical properties and ozone resistance. The results obtained were as shown in Table 4.

EXAMPLE 4

Injection curing was carried out on the rubber compositions of sample Nos. 17, 18 and 19 in Table 5 of Example 3 by means of a conventional injection molding machine. The results obtained were as shown in Table 7.

TABLE 4

| Item of test | Sample number | | | | | | | | |
|---|---|---|---|---|---|---|---|---|---|
| | 8 a | 9 | 10 | 11 | 12 a | 13 | 14 | 15 | 16 |
| Green strength:[1] | | | | | | | | | |
| At room temperature: | | | | | | | | | |
| 50% modulus, kg./cm.$^2$ | 4.7 | 5.5 | 8.5 | 17.3 | 2.8 | 3.6 | 7.5 | 18.0 | 16.5 |
| 100% modulus, kg./cm.$^2$ | 4.3 | 5.5 | 9.2 | 23.7 | 2.6 | 3.5 | 8.9 | 23.3 | 17.0 |
| Tensile strength, kg./cm.$^2$ | 4.8 | 5.9 | 10.6 | 35.0 | 2.9 | 3.7 | 9.8 | 29.9 | 15.5 |
| Elongation, percent | 670 | 490 | 550 | 310 | 1,700 | 1,700 | 1,150 | 410 | 540 |
| At 40° C.: | | | | | | | | | |
| Tensile strength, kg./cm.$^2$ | 3.5 | 4.2 | 7.8 | 19.1 | 2.4 | 2.9 | 4.9 | 16.1 | 11.1 |
| Elongation, percent | 370 | 350 | 230 | 250 | 370 | 440 | 440 | 500 | 300 |
| At 80° C.: | | | | | | | | | |
| Tensile strength, kg./cm.$^2$ | 1.3 | 1.7 | 2.2 | 3.3 | 1.4 | 1.4 | 2.3 | 4.1 | 3.0 |
| Elongation, percent | 370 | 260 | 260 | 220 | 340 | 320 | 290 | 270 | 300 |
| Extrudability:[2] | | | | | | | | | |
| Rate of extrusion, cc./min | 188.3 | 197.1 | 192.0 | 210.3 | | | | | |
| Die shrinkage, percent | 44.2 | 44.0 | 43.4 | 46.0 | | | | | |
| Die swelling, percent | 79.2 | 78.6 | 76.7 | 85.2 | | | | | |
| Physical properties of vulcanizate:[3] | | | | | | | | | |
| 300% modulus, kg./cm.$^2$ | 70 | 73 | 89 | 115 | 150 | 137 | 155 | 157 | 100 |
| Tensile strength, kg./cm.$^2$ | 232 | 224 | 226 | 215 | 304 | 280 | 285 | 248 | 233 |
| Elongation, percent | 740 | 720 | 680 | 640 | 540 | 530 | 530 | 490 | 700 |
| Hardness, JIS Hs | 63 | 65 | 70 | 77 | 66 | 67 | 71 | 76 | 78 |
| Impact resilience, percent | 53 | 52 | 50 | 47 | | | | | |
| Compression permanent set, percent | 23 | 24 | 28 | 37 | | | | | |

[1] The same as in Table 2.
[2] The same as in Table 2.
[3] The same as in Table 2.

a Comparative example.

EXAMPLE 3

Mixtures prepared in accordance with the compound recipes (parts by weight) shown in Table 5 were blended by Banbury's mixer to obtain rubber composition.

TABLE 5

| Compounding ingredient (parts by wt.) | Sample number | | |
|---|---|---|---|
| | 17[1] | 18 | 19 |
| 1,2-Polybutadiene E | 0 | 10 | 20 |
| cis-Polyisoprene rubber (Natsyn 2200) | 100 | 90 | 80 |
| Transparent zinc oxide | | 3 | |
| Stearic acid | | 2 | |
| Process oil (naphthenic oil) | | 30 | |
| White carbon (hydrous silica) | | 15 | |
| Antioxidant (2,6-di-t.-butyl-p-cresol) | | 1.5 | |
| Antiozone-crack agent (Sunnoc; selected special wax)* | | 0.5 | |
| Peptizer (zinc 2-benzamidothiophenate) | | 0.5 | |
| Sulfur | | 1.8 | |
| Accelerator (mercapto benzothiazole) | | 1.6 | |
| Accelerator (tetramethylthiuram disulfide) | | 0.4 | |

[1] Comparative example.

* Manufactured by Ohuchi Shinko Kagaku Kogyo Co., Ltd.

Measurements were conducted on the resulting compositions for Mooney viscosity and mold flow characteristics and on the vulcanizates of the compositions for physical properties. The results obtained were as shown in Table 6.

TABLE 6

| Item of test | Sample number | | |
|---|---|---|---|
| | 17 a | 18 | 19 |
| Mooney viscosity, ML$^{1+4}$, 100° C | 15.0 | 15.0 | 12.0 |
| Moldability, "Koka" type flow test[1], cm.$^3$/sec | 0.135 | 0.230 | 0.285 |
| Physical properties of vulcanizate[2] | | | |
| 300% modulus, kg./cm.$^2$ | 10 | 14 | 17 |
| Tensile strength, kg./cm.$^2$ | 105 | 110 | 103 |
| Elongation, percent | 940 | 930 | 880 |
| Hardness, JIS Hs | 22 | 36 | 38 |

[1] T. Arai, "A Guide to the Testing of Rheological Properties with Koka Flow Tester", Maruzen, Tokyo (1958).
[2] Measured on vulcanizate obtained by presscuring the composition at 160° C. for 15 minutes.

a Comparative example.

The mold used was a cylindrical mold, 100 mm. in diameter, 400 mm. in length, and 0.5 mm. in thickness, provided with an injection gate on the top of one end of the cylinder. The injection pressure was 75 kg./cm.$^2$ and curing was effected at 170° C. for 4 minutes.

TABLE 7

| Sample number | Flow state | Condition of molded article | Remarks |
|---|---|---|---|
| 17 | Upper part of the mold: flowed 220 mm. Lower part of the mold: flowed 180 mm. | Poor | Comparative example. |
| 18 | Flowed 400 mm. (flow was a little difficult at the lower part of the mold on the side opposite to the gate). | Good | Examples. |
| 19 | Perfectly flowed 400 mm | Very good | |

What is claimed is:

1. A rubber composition consisting essentially of 3 to 50% by weight of a 1,2-polybutadiene having a 1,2-addition units content of 70% or higher and crystallinity of 5% or higher, and 97 to 50% by weight of at least one conjugated diene-based rubbery polymer selected from the group consisting of styrene-butadiene copolymer rubber, polyisoprene rubber, natural rubber, acrylonitrile-butadiene copolymer rubber and polychloroprene rubber.

2. A rubber composition consisting essentially of 3 to 50% by weight of a 1,2-polybutadiene having a 1,2-addition units content of 70% or higher and crystallinity of 5% or higher, and 97 to 50% by weight of at least one conjugated diene-based rubbery polymer selected from the group consisting of styrene-butadiene copolymer rubber, polyisoprene rubber and natural rubber.

3. A rubber composition according to Claim 1, wherein the 1,2-polybutadiene has a 1,2-addition units content of 85% or higher.

4. A rubber composition according to Claim 2, wherein the 1,2-polybutadiene has a 1,2-addition units content of 85% or higher.

5. A rubber composition according to Claim 1, wherein the 1,2-polybutadiene has a crystallinity of 10 to 50%.

6. A rubber composition according to Claim 2, wherein the 1,2-polybutadiene has a crystallinity of 10 to 50%.

7. A rubber composition according to Claim 3, wherein the 1,2-polybutadiene has a crystallinity of 10 to 50%.

8. A rubber composition according to Claim 4, wherein the 1,2-polybutadiene has a crystallinity of 10 to 50%.

9. A rubber composition according to Claim 1, wherein the amount of the 1,2-polybutadiene is 5 to 30% by weight.

10. A rubber composition according to Claim 1, wherein the 1,2-polybutadiene has an intrinsic viscosity of 0.7 dl./g. or higher (determined in toluene at 30° C.).

11. A rubber composition according to Claim 2, wherein the 1,2-polybutadiene has an intrinsic viscosity of 0.7 dl./g. or higher (determined in toluene at 30° C.).

References Cited

UNITED STATES PATENTS 3,696,062   11/1972   Lesage et al. _____ 260—5

MURRAY TILLMAN, Primary Examiner

J. ZIEGLER, Assistant Examiner

U.S. Cl. X.R.

260—2.5 L, 33.6 AQ, 41.5 A, 890, 894